(12) United States Patent
Nierzwick et al.

(10) Patent No.: US 8,743,285 B2
(45) Date of Patent: Jun. 3, 2014

(54) AUTOMATIC RETURN TO A HIGH-DEFINITION MODE AFTER GUIDE DEMONSTRATION

(75) Inventors: Mark Alan Nierzwick, Brownsburg, IN (US); Carlton Jethro Simmons, Fortville, IN (US)

(73) Assignee: Thomson Licensing, Boulogne Cedex (FR)

( * ) Notice: Subject to any disclaimer, the term of this patent is extended or adjusted under 35 U.S.C. 154(b) by 1380 days.

(21) Appl. No.: 10/202,324

(22) Filed: Jul. 24, 2002

(65) Prior Publication Data

US 2003/0043296 A1 Mar. 6, 2003

Related U.S. Application Data

(60) Provisional application No. 60/316,246, filed on Aug. 31, 2001.

(51) Int. Cl.
*H04N 5/46* (2006.01)
(52) U.S. Cl.
USPC .......................................... 348/556; 348/555
(58) Field of Classification Search
USPC ......... 348/554–558, 705, 706, 563, 553, 564, 348/569; 725/54, 55
See application file for complete search history.

(56) References Cited

U.S. PATENT DOCUMENTS

| | | | | |
|---|---|---|---|---|
| 4,386,377 A | * | 5/1983 | Hunter, Jr. .................... | 386/106 |
| 5,218,436 A | | 6/1993 | Sugiyama et al. | |
| 5,461,427 A | * | 10/1995 | Duffield et al. ............... | 348/555 |
| 5,510,848 A | | 4/1996 | Nocture et al. ............... | 348/556 |
| 5,557,337 A | * | 9/1996 | Scarpa ......................... | 348/558 |
| 5,724,102 A | * | 3/1998 | Harrison et al. .............. | 348/552 |
| 5,764,304 A | * | 6/1998 | Harrison et al. .............. | 348/552 |
| 6,108,044 A | * | 8/2000 | Shin ............................. | 348/555 |
| 6,335,762 B1 | | 1/2002 | Lee .............................. | 348/558 |
| 6,418,556 B1 | * | 7/2002 | Bennington et al. .......... | 725/40 |
| 6,504,826 B1 | | 1/2003 | Kato et al. | |
| 6,665,871 B1 | * | 12/2003 | Macrae et al. ................ | 725/54 |

FOREIGN PATENT DOCUMENTS

| | | |
|---|---|---|
| CN | 1140950 A | 1/1997 |
| EP | 0847192 A1 | 6/1998 |
| JP | 3218192 | 9/1991 |
| JP | 11069251 | 3/1999 |
| JP | 11146291 | 5/1999 |
| JP | 11355225 | 12/1999 |
| JP | 2000138877 | 5/2000 |
| JP | 2001111907 | 4/2001 |
| WO | WO 00/70867 | 11/2000 |

OTHER PUBLICATIONS

Consumers give StarSight on-screenTV program guide strong approval in Viacom Cable's Castro Valley system; initial feedback supports market penetration rate of 50 percent, Business Wire, Mar. 21, 1995.*
EPO Search Report dated: Mar. 13, 2003.
Patent Abstracts of Japan, vol. 1999, No. 08, Jun. 30, 1999 (Samsung Electron Co. Ltd.) (corresponds to U.S. 6,335,762, cited as AB).

\* cited by examiner

*Primary Examiner* — Michael Lee
(74) *Attorney, Agent, or Firm* — Robert D. Shedd; Reitseng Lin

(57) ABSTRACT

A high definition television monitor adapted to display a program guide, for example an electronic program guide demonstration, in low definition mode (1H) and automatically switch to high definition mode (2H) upon completion of the program guide display.

16 Claims, 2 Drawing Sheets

US 8,743,285 B2

AUTOMATIC RETURN TO A HIGH-DEFINITION MODE AFTER GUIDE DEMONSTRATION

CROSS REFERENCE

This application claims the benefit of U.S. Provisional Application No. 60/316,246 filed Aug. 31, 2001, in the name of the present inventors.

FIELD OF THE INVENTION

The present invention generally relates to high definition television systems and methods, and particularly to high definition televisions which are capable of displaying an electronic program guide demonstration in low definition mode.

BACKGROUND OF THE INVENTION

Low definition, or standard definition, modes of television systems have a horizontal scanning frequency of 15.734 KHz (1H). High definition is defined as a scanning frequency of nominally 2.14H (2H) or about 33.6 KHz.

It is a common practice in a retail setting to display a high-resolution source such as a source from a progressive scan 2H DVD player on a TV/Monitor capable of displaying either the high-resolution source (2H) or the standard resolution source (1H), in order to impress potential customers with the capability of the television. One example of such a television capable of displaying such multiple sources is the RCA model CTC210, marketed by Thomson Multimedia, Inc., of Indianapolis, Ind. The CTC 210 and similar television systems, however, contain in permanent memory a simulated interactive program guide that can only be displayed while the television is in the 1H mode.

The present inventors recognize that it is desirable to allow potential customers to run the guide demo since it is a significant feature. But since the program guide cannot be displayed in non-1H modes, there is a need for such televisions to automatically change to the 1-H mode when the guide demo is requested.

The present invention relates to automatically returning the television mode to 2H so that it can display the high-resolution source.

It is common for a customer to start the program guide demo then walk away, without manually ending the demo, thereby leaving the television in 1-H mode.

It is an object of the present invention to overcome this problem in the art by automatically returning the television to 2-H mode after the program guide demo is completed, without any user intervention.

Another object of the invention is to make the automatic return to 2-H mode an optional feature which can be turned on and off by a user or at the factory.

These objects and others which will become apparent from the following disclosure and the accompanying drawings are achieved by the present invention which comprises a television system comprising means to display video from a first source in a low definition (1H) mode and to display video from a second source in a high definition (2H) mode;

means to switch to 1H mode when the first source is selected; and means to automatically switch to 2H mode when the first source is deselected or inactive.

In another aspect, the invention comprises a method of displaying a low definition (1H) program guide on a high definition television monitor comprising receiving a user selection to display a program guide;

switching to a 1H mode; and upon completion of the program guide selection, automatically switching to a 2H mode.

The preferred first source is an electronic program guide stored in memory, and the preferred second sources are external digital video disk (DVD) player, a gaming system, or a satellite box.

The system is preferably programmed to automatically switch to 1H mode when the demonstration program guide is selected or is automatically started. The demonstration can be started with a remote controller when a customer in a retail setting presses a program guide key. The television set can include a hardware pin which, when plugged into a port on the back of the TV, can trigger the demonstration whenever a customer selects program guide with the controller or panel keys. A software program can automatically start the program guide demo at predetermined times or after elapse of a predetermined time in an alternative embodiment.

The 1H video supplied by the first or other source can be upconverted to 2H using conventional circuitry adapted for that purpose.

BRIEF DESCRIPTIONS OF THE DRAWINGS

DETAILED DESCRIPTION

Figure 1:
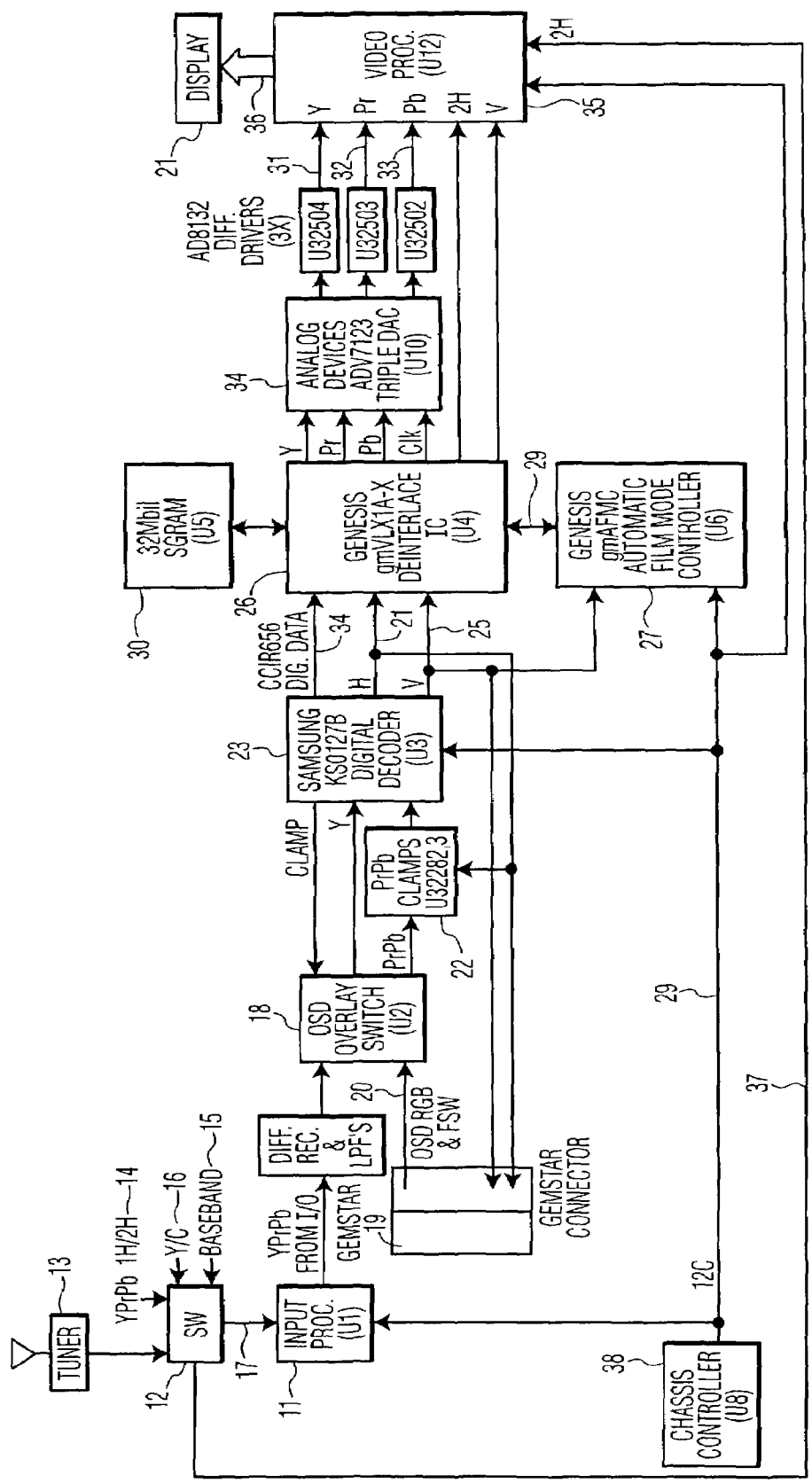
FIG. 1 is a simplified block schematic diagram of a video apparatus according to the invention.

FIG. 1 presents a block schematic diagram of a video apparatus which can accept various video input signals of either standard or high definition with a nominal scanning frequency of 1H or nominally 2H.

The SD or 1H input signals are processed to enable display at a double frequency rate. Standard definition signals are input to video processor integrated circuit U1 11, for example Toshiba type TA1286NF, via a selector switch matrix SW 12 which allows user selection from various sources, for example, a demodulated RF or IF signal 13, an external Y/C component signal 16 comprising luminance and encoded subcarrier 14, NTSC encoded signals 15 or Y/Pr/Pb input 14.

The external composite NTSC signal is initially comb filtered to produce separated luminance and encoded subcarrier prior to the selector matrix switch 12. Thus the SD input 17 to video processor U1 11 is in the form of luminance and encoded subcarrier components known as YC. Video processor U1 11 includes a sync separator SS, and an NTSC decoder and matrix arrangement which decodes and forms color difference signals for example R-Y, and B-Y or Pr and Pb. The luminance or Y signal input is coupled via sync separator SS which provides separated (1H) sync pulses at pin 18 of IC U1 11. The Y signal with sync pulses is output at pin 4 and coupled via an advantageous gated sync pulse stretcher, to an overlay switch or matrix switch integrated circuit U2, for example Toshiba type TA1287F.

Video or program guide information is generated by a Gemstar™ circuit module 19 and is coupled 20 as red, green and blue signals together with a fast switch signal, (FSW), for processing as an on screen display (OSD) by overlay switch IC U2 18, prior to up-conversion. The switching or mixed superimposition of the Gemstar™ OSD signals 20 is accomplished by IC U2 18, which in addition also provides a matrix which converts the GemStar™ originated RGB OSD signals 20 to luminance and color difference components, for example Y R-Y B-Y, Y Pr Pb, YUV or YIQ. The GemStar module 19 has its own RAM and supplies 1H program guide data either from RAM derived from VBI information or a canned demo program guide stored in ROM. In the case where the demonstration data is stored in ROM, when the demonstration is started, if there is no live data present in RAM, the demo data gets loaded into RAM from the ROM to simulate live data. When the demo is exited, the demo data is erased from the RAM.

The outputs from overlay switch IC U2 18 are coupled via Pr/Pb clamps 22, to a digital decoder, IC U3 23, for example Samsung type KS0127B. Integrated circuit U3 23 digitizes the luminance and coloring signals received from overlay switch U2 18 and forms a data stream 24 conforming to CCIR standard 656. In this receiver monitor display system, the master source of horizontal 21 and vertical 25 sync signals is chosen to be sync signals extracted from the luminance signal input to digital decoder U3 23.

The digitized component signal bit stream (Bs) is coupled to a de-interlacer system comprising a de-interlacing integrated circuit U4 26, for example Genesis Micro type gmVLX1A-X, and a film mode controller IC U6 27, for example Genesis Micro type gmAFMC. Integrated circuit U6 27 is controlled by and communicates with chassis controller U8 38 via the I²C bus 28, however communication between IC U4 26 and IC U6 27 is via a separate data bus 29. De-interlacing is initiated within IC U4 26 which examines the incoming component video data stream to determine the best method for constructing interpolated lines prior to storing each field in a 32 bit SGRAM memory IC U5 30, for example AMIC type A45L9332. If motion is not detected, the system repeats information from the previous field to provide a complete frame of non-moving video. However, if motion is detected, vertical/temporal filtering is applied using lines and fields around the interpolated line to provide an interpolated signal essentially free of motion artifacts. Film mode controller IC, U6 27 detects the presence of video signals which originated from 24 Hz film by monitoring motion artifacts for the presence of a cyclical variation occurring at a 5 field rate. This 5 field repetition rate results from a so called 3:2 pull-down telecine process used to produce a nominal display rate of 60 Hz by the cyclical duplication of individual fields. Thus, having detected film original material the interpolated signal can be assembled with temporally correct lines from a previous field.

The resulting 2H scan rate digital video, in the form of three 8 bit data streams (Y 31, Pr 32 and Pb 33) are output from de-interlacing IC U4 26 and coupled for digital to analog conversion and analog signal processing prior to subsequent display. The D-to-A processing is performed by, for example, by U10 34, an Analog Devices ADV7123 IC. The analog output of this IC is then further processed by a back-end video processor 35 which produce RGB outputs 36 to be displayed on a display device 21.

A 2-H or high resolution source may be inputted to the present system via for example, the Y/Pr/Pb input 14 connected to the matrix switch. If the system is then put into the 2-H mode, this matrix switch 12 will cause the signal to be routed 37 to the video processor 35 to be processed directly, without the up conversion previously described.

Figure 2:
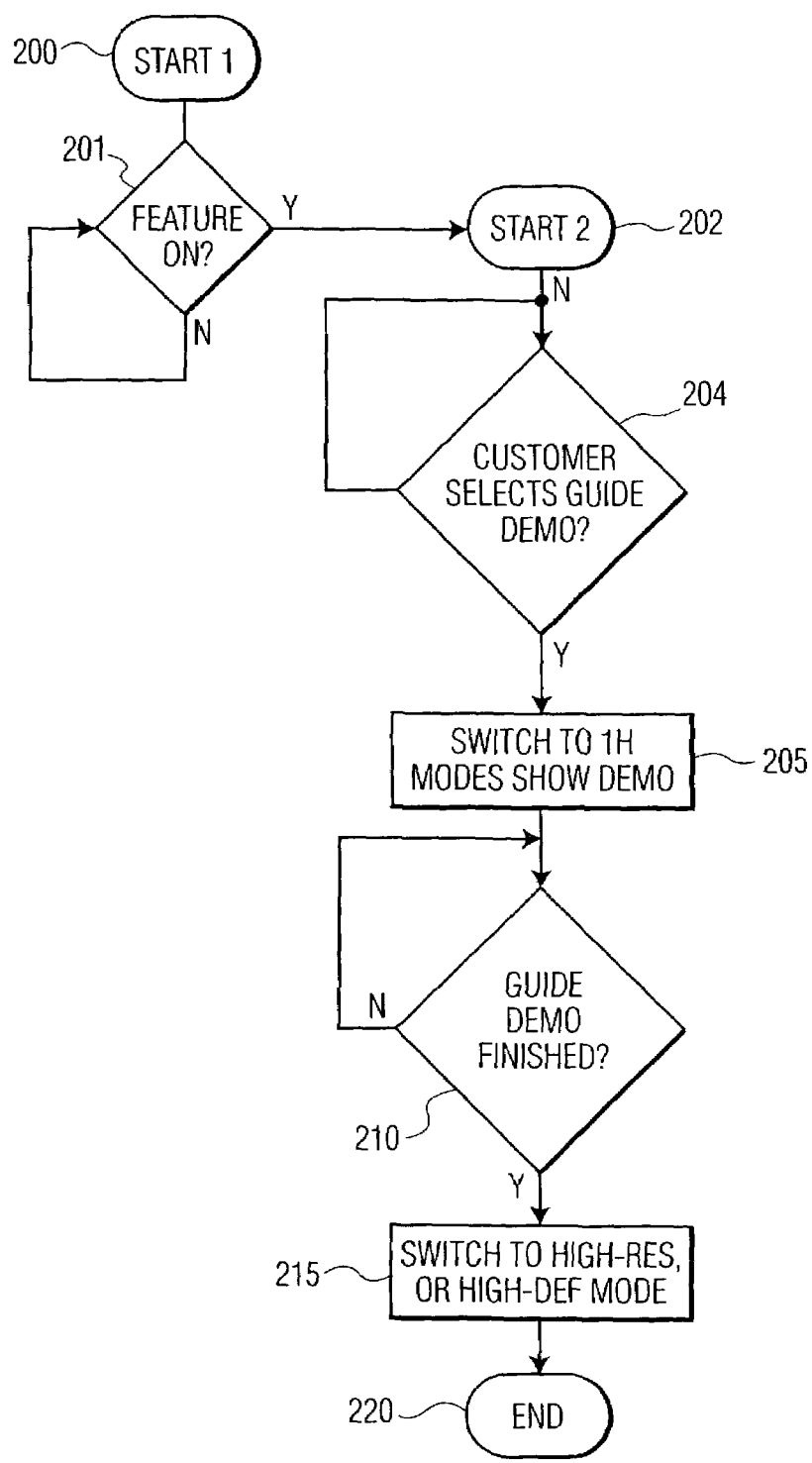
FIG. 2 represents a flow chart according to the present invention.

FIG. 2 shows a flow chart exemplifying the present invention. The routine is entered at step 200. As shown in Step 201, this feature may be set as default (i.e., on or off) either at the factory or by a user. If this feature is set to on 202, the chassis controller will first determine 204 if a selection has been made to activate the guide demo. At step 205, if this selection has been made, the controller will automatically switch the system to 1H mode and start to show the guide demo which has been previously stored in the system. The controller will then determine if the demo has finished or has been terminated by a user, at step 210. If either of these is the case, then the controller will switch the system automatically to a high resolution or a high definition mode, as shown in step 215. The routine is exited by 220.

A preferred embodiment is a high definition television monitor which includes a GemStar electronic program guide module 19 having a program guide demonstration burned into ROM which is designed to display a program guide having canned data to prospective customers upon pressing a program guide key on a remote control unit while the television monitor is in demo mode. The television monitor is programmed to automatically display a source of 2H signal, preferably from a 2H DVD player when the 1H program guide is not selected.

Upon selection of the 1H program guide, the television monitor switches to 1H mode until the prospective customer reselects a source of 2H signal such as the DVD player or until the program guide demo is completed, or until a predetermined time period has expired at which point the television monitor resumes 2H mode. The guide software preferably sends an end of demo signal to the television software which in turn switches the sources back to the 2H input.

The demo can be of various types. For example, it can be a continuous demo which is activated using either the remote controller or front panel keys to select the appropriate menu item. Alternatively, it can be triggered by the presence of a hardware pin plugged into a port in the back of the television set which causes the demo to start automatically when the customer in the retail setting presses the electronic program guide key, i.e., the same program guide key as is used in a normal at home setting.

What is claimed is:

1. A television system, comprising:
    an input for receiving signals including video content from one or more external sources, said signals being in one of a lower definition format and a higher definition format;
    circuitry for enabling display of said video content in one of a lower definition mode and a higher definition mode of said television system;
    circuitry for switching said television system between said lower definition mode and said higher definition mode;
    a memory for storing video content corresponding to an electronic program guide demonstration; and
    wherein said television system automatically switches from said higher definition mode to said lower definition mode in response to an activation of said electronic program guide demonstration while said signals received at said input are in said higher definition format and not in said lower definition format, and automatically switches back from said lower definition mode to said higher definition mode in response to one of said electronic program guide demonstration being completed and a predetermined time period having expired.

2. The television system of claim 1 wherein video content provided from one of an external digital video disk (DVD) player, a gaming system, and a satellite box is displayed in said higher definition mode.

3. The television system of claim 1 wherein said activation of said electronic program guide demonstration occurs in response to a user input.

4. The television system of claim 1 wherein said activation of said electronic program guide demonstration occurs in response to one of a user input to a program guide demonstration switch of a remote control device, a user input to a key or combination of keys on a front panel of said television system, and a software program which automatically starts said electronic program guide demonstration after a predetermined period of time has passed after a previous demonstration.

5. The television system of claim 1 wherein said video content corresponding to said electronic program guide demonstration is upconverted prior to being displayed.

6. A method for operating a television system, comprising:
receiving, at an input of said television system, signals including video content from one or more external sources, said signals being in one of a lower definition format and a higher definition format;
detecting an activation of an electronic program guide demonstration stored in a memory of said television system;
switching said television system from a higher definition mode to a lower definition mode in response to said activation while said signals received at said input are in said higher definition format and not in said lower definition format;
detecting one of said electronic program guide demonstration being completed and a predetermined time period having expired; and
switching said television system from said lower definition mode back to said higher definition mode in response to said detecting step.

7. The method of claim 6 wherein data corresponding to said electronic program guide demonstration is digitally encoded and stored in said memory of said television system.

8. The method of claim 6 wherein video data provided from one of a digital video disk (DUD) player, a satellite box, and a gaming system is processed and displayed when said television system is in said higher definition mode.

9. The method of claim 6 wherein said television system comprises a high definition television tuner.

10. The method of claim 6 wherein said activation of said electronic program guide demonstration occurs in response to a user input to said television system.

11. The method of claim 6 wherein video content corresponding to said electronic program guide demonstration is upconverted prior to being displayed.

12. The method of claim 11 wherein said video content corresponding to said electronic program guide demonstration is overlaid onto a video signal prior to being upconverted.

13. A television system comprising:
an input for receiving signals including video content from one or more external sources, said signals being in one of a lower definition format and a higher definition format;
circuitry for enabling display of video content in one of a lower definition mode and a higher definition mode of said television system;
a controller for switching said television system between said lower definition mode and said higher definition mode;
a memory for storing video content corresponding to an electronic program guide demonstration; and
wherein said controller automatically switches said television system from said higher definition mode to said lower definition mode in response to activation of the electronic program guide demonstration while said signals received at said input are in said higher definition format and not in said lower definition format, and automatically switches said television system back from said lower definition mode to said higher definition mode in response to one of said electronic program guide demonstration being completed and a predetermined time period having expired.

14. The television system of claim 13 wherein video content provided from one of an external digital video disk (DVD) player, a gaming system, and a satellite box is displayed in said higher definition mode.

15. The television system of claim 13 wherein said activation of said electronic program guide demonstration occurs in response to a user input.

16. The television system of claim 13 wherein said activation of said electronic program guide demonstration occurs in response to one of a user input to a program guide demonstration switch of a remote control device, a user input to a key or combination of keys on a front panel of said television system, and a software program which automatically starts said electronic program guide demonstration after a predetermined period of time has passed after a previous demonstration.

* * * * *